United States Patent Office 2,835,588
Patented May 20, 1958

2,835,588
METHOD OF MAKING A CULINARY MIX
Henry B. Alexander, Morristown, N. J., and Richard Laster, Forest Hills, N. Y., assignors to General Foods Corporation, New York, N. Y., a corporation of Delaware No Drawing. Application March 4, 1953
Serial No. 340,398
3 Claims. (Cl. 99—94)

The present invention relates to the production of improved culinary mixes, and more particularly one that can be mixed with aqueous liquid more easily than similar mixes heretofore known.

The expression "culinary mix" is used herein to refer to dry mixes comprising flour and shortening and which may or may not comprise other ingredients such as sugar, dried milk, leavening agents, etc. Such culinary mixes can be formed into batters or doughs upon the addition of water, milk or other edible aqueous liquid and backed into cakes, breads, biscuits, muffins, pie crusts and other baked products.

The culinary mixes available on the market today are prepared in a number of ways which are largely trade secrets but all the various mixes available present substantially the same problem relating to the work required to incorporate aqueous liquid into the mix in the preparation of a batter or dough. Because of the greater proportion of aqueous liquid incorporated, the problem is considerably greater in the case of a batter. This is particularly the case with the usual cake batter which because of the relatively high proportion of shortening it contains is even more difficult to prepare.

The above problem can best be illustrated by considering the work involved in incorporating aqueous liquid into one of the chocolate cake mixes presently on the market. To the dry ingredients of the mix the housewife must add milk equal to about three-quarters of the weight of the dry ingredients. This is done in three stages. At the first stage about three-eighths of the milk is added and after this addition the mixing requires 300 strokes of beating. These strokes are accomplished with great difficulty due to the fact that the batter at this stage is very gummy and unworkable. The second addition of about one-fourth of the milk is followed by 300 strokes of beating which, although not as difficult as those following the first liquid addition, are, nevertheless, very tiring. The addition of the remainder of the milk is followed by 150 strokes of easier beating. The total of 750 strokes of beating of which 600 are quite difficult requires a great deal of fatiguing effort. The manner of liquid addition and the amount of work required to incorporate the aqueous liquid into the cake mix varies, depending upon the particular type of cake mix involved. In addition, the care required for correct liquid addition places upon the housewife a severe requirement which frequently is not met with resultant cake failure.

In his patent, Re. 23,484, Johnson discloses a method whereby super-cooled liquid shortening may be employed in the preparation of a culinary mix. It has now been found that the housewife's task of preparing a batter or a dough from a culinary mix is greatly facilitated if in the preparation of the culinary mix itself the shortening is incorporated into the flour and other ingredients by atomizing super-cooled liquid shortening.

In atomizing the supercooled liquid shortening with which the present invention is concerned, it is necessary that the shortening be subdivided into discrete particles for admixture with the flour and other constituents of the culinary mix. Suitable subdivision may be obtained by the use of any number of atomizing devices available on the market today, such as the so-called centrifugal types of nozzles which are marketed by Spraying Systems Company and described in their catalog entitled "Spraying Systems, Nozzles and Related Products," Catalog No. 22, copyrighted 1943. One type of spray nozzle involves the high velocity introduction of a stream of liquid into a conical chamber tangentially with respect to the circular cross-section of the chamber. An orifice located at the apex of the cone is the exit point for the material to be sprayed and the result is that the material is atomized in a hollow cone spray pattern. Other types of spray nozzles manufactured by the same concern involve the use of internal vanes which set up a swirling action resulting in a full cone spray pattern. Still other types manufactured by the same concern involve fairly large diameter chambers terminating in variously shaped small orifices or, on the other hand, a relatively larger orifice which causes the emerging stream of liquid to impinge upon an adjacent surface whereby the desired atomization is effected.

Another suitable spray nozzle is one employing two jets of liquid which impinge upon each other at about an angle of 90° with a resultant disintegration of the two streams and provision of the desired discrete particles. It is also possible to employ one jet or stream of air in conjunction with a stream of liquid. Moreover, the angle between the impinging streams may be altered to advantage depending upon the material being sprayed.

Another type of atomizing device which may be employed is the rotating disc type in which a stream of liquified shortening is caused to impinge upon a spinning disc near the center. Also, a regular spray nozzle if directed upwardly so that the atomized particles will then fall back onto the surface of the flour and other ingredients will prove to be satisfactory.

In any event, it is known that merely allowing the liquid shortening to drip into the flour and other ingredients will not supply the atomization which is necessary for the process of the present invention. In this connection it has been determined that the particle size of such a drop of liquid shortening which is formed by ordinary dripping and the size of which is determined by gravity, surface tension, interfacial tension and other factors is of the order of 0.5–1.0 cc. The particle size of the atomized particles with which the present invention is concerned is much smaller, but the exact size of the particles is not a practical consideration because as aforementioned practically all of the spraying devices which are commercially available provide particles small enough to operate successfully. By way of illustration the range of particle sizes produced by commercially available equipment is from about 0.07 cc. down to the point where the spray of atomized particles becomes fog-like. It will be understood that these sizes are not limiting and that the same spray equipment nozzle will result in particles of different sizes when using a shortening having somewhat different physical properties.

As indicated above, it is also important in carrying out the process of the present invention that the flour and other ingredients comprising the culinary mix be agitated in some manner to present to the spray of atomized shortening a surface which is being constantly renewed. Agitation in any suitable manner will serve to bring about the desired renewal of surface. Such agitation includes the use of blades or paddles revolving horizontally or vertically and it is also possible to employ an air stream or the material may be tumbled within a rotating drum. One very suitable type of device commonly found in operations of the sort involved here is referred to as a "ribbon blender" in which the mixing element consists of several vertical paddles and two helical ribbons, one a right-hand screw and the other a left-hand screw, so that the material is moved back and forth from one end of the container to the other, and also lifted vertically.

The primary objective of the present invention is to introduce shortening in an atomized condition to dry ingredients containing flour. The ingredients other than flour that are present can be varied within a wide range depending on the final product desired. The advantages of the present invention will be achieved, however, if the liquid super-cooled shortening is sprayed into ingredients not containing flour and thereafter adding flour particularly in the case where only relatively small amounts of flour are used such as in cake mixes.

To illustrate the application of the present invention to various culinary mixes the following detailed examples are set forth.

*Example 1*

In preparing white, yellow and chocolate cake mixes all of the ingredients for each mix except the shortening were mixed together in a ribbon blender at a moderate speed for about 3 minutes. For each mix the ingredients comprised about 35% of flour, except the chocolate mix which contained only about 30%, about 45% of sugar, about 0.5% salt and about 1.5% leavening material. The white and chocolate cakes contained about 2.0% dried egg white, whereas the yellow cake mix contained about 4.0% of dried whole eggs. The chocolate cake mix contained somewhat less than 10% chocolate flavoring material.

Shortening for these mixes was prepared by a continuous process of chilling purified vegetable oil in a votator, beating the same in a "worker" unit and delivering by pumping to the ribbon blender through a centrifugal type nozzle having an orifice of 3/16 inch and operating at a pressure of 280 lbs./sq. in. after the aforementioned 3 minutes of dry mixing. Enough shortening was added in each case to bring the total amount of ingredients up to 100% and the time required to spray in all of the shortening was about 8 minutes for each type of mix. After all of the shortening had been added about 3 minutes of additional mixing in the ribbon blender was allowed.

Emulsifiers may of course be added if desired at any time during the mixing operation.

To assure a satisfactory distribution of all the ingredients the above mixes were allowed to set for about 90 minutes and thereafter a small amount of additional mixing was applied.

To test the performance of these mixes, to about 16–17 ounces of each mix was added 1¼ cups of milk in the case of the yellow and chocolate cakes, and 1⅙ cups of milk in the case of the white cake. The batter mixed easily and was of a thin, almost watery consistency. It required no beating but only a stirring action. It was sufficient to stir the mix only about 300 strokes.

The batters were then baked in an oven at 375° F. for about 20–30 minutes until baking was completed. The resulting cakes were equal to or better than cakes prepared by multi-stage liquid addition in all respects including volume, eating qualities, crumb characteristics, and the like.

When the identical procedure outlined above for white, yellow or chocolate cake mixes was employed except that the shortening was introduced in the ordinary way, it was impossible to make a good cake by single liquid addition and the aforementioned difficult three-stage liquid addition had to be employed to achieve a satisfactory cake.

*Example 2*

A spice cake was prepared in the manner described in Example 1 for the white cake. However, spices such as cinnamon, nutmeg and cloves were added to the dry ingredients during mixing prior to the addition of the shortening. Moreover, the centrifugal nozzle of Example 1 was replaced with a pair of intercoursing jets each operating under a pressure of 250 lbs./sq. in and having a diameter of about 1/32 inch. The angle incidence was about 150°. The results were substantially the same as described in Example 1.

Muffin mixes and pancake mixes were prepared using the ordinary formulations therefor with the exception that liquid super-cooled shortening in an atomized condition was sprayed onto an agitated surface of the dry ingredients. Excellent products were obtained when prepared by the use of a single addition of milk. The muffin mix for example contained 74.10% flour, 7.41% sugar, 3% dried whole eggs, 0.70% salt, and 1.45% leavening material as the dry ingredients and the remaining material comprising atomized liquid super-cooled shortening.

In making doughs such as for pie crust mix, pastry mix and biscuit mix the same procedure is followed but again only the formulation is different although mixing times may be altered for optimum results. To prepare such products it is unnecessary to add a great deal of aqueous liquid in order to prepare final baked goods; however, it has been found that even these products are easier to prepare to a dough if the liquid super-cooled shortening is sprayed into a mix of the dry ingredients.

It will be apparent that culinary mixes other than those having the described formulations herein may be made in accordance with the invention and will have the advantages described therefor and all such variations are included within the scope of the invention as fall within the following claims.

What is claimed is:

1. A method of making a culinary mix having ingredients comprising flour and shortening in proportions to form an edible culinary product when the mix is mixed with an aqueous edible liquid and baked, which comprises rapidly chilling shortening stock with agitation so as to develop crystal nuclei but with a substantial proportion in a super-cooled condition, so that the shortening is still liquid, atomizing discrete particles of the liquid super-cooled shortening directly into said dry ingredients while the latter are being agitated and overturned to renew continually the surfaces on which said particles impinge so that the discrete particles of shortening are mixed and distributed throughout said dry ingredients.

2. A method of making a culinary mix having ingredients comprising flour and shortening in proportions to form an edible product when the mix is mixed with an aqueous edible liquid and baked, which method comprises atomizing liquid, super-cooled shortening as fine particles having a maximum size of about 0.07 cc. into the dry ingredients of said mix while agitating and overturning said ingredients to renew continually the surfaces on which said particles impinge.

3. A method of making a cake mix having ingredients comprised of flour, sugar, shortening and a leavening agent in proportions to form an edible cake when the mix is mixed with aqueous edible liquid and baked, which comprises rapidly chilling shortening stock with agitation so as to develop crystal nuclei by adding a substantial proportion in a super-cooled condition so that the shortening is still liquid, atomizing discrete particles of the liquid super-cooled shortening directly into said dry ingredients while the latter are being agitated and overturned to renew continually the surfaces on which said particles impinge so that the discrete particles of shortening are mixed and distributed throughout said dry ingredients.

References Cited in the file of this patent

UNITED STATES PATENTS

| | | |
|---|---|---|
| Re. 23,484 | Johnson | Apr. 29, 1952 |
| 1,326,276 | Kohman et al. | Dec. 30, 1919 |
| 2,234,931 | Newton | Mar. 11, 1941 |
| 2,401,259 | Lloyd | May 28, 1946 |
| 2,499,586 | Johnson | Mar. 7, 1950 |

OTHER REFERENCES

McCarthy, Food Industries, November 1949, pages 79–88, page 79 relied upon.